(12) United States Patent
Marchant et al.

(10) Patent No.: US 9,513,166 B2
(45) Date of Patent: Dec. 6, 2016

(54) SPLIT FIELD SPECTRAL IMAGER

(71) Applicants: Alan B. Marchant, Hyrum, UT (US); Stephanie W. Sullivan, Cusick, WA (US)

(72) Inventors: Alan B. Marchant, Hyrum, UT (US); Stephanie W. Sullivan, Cusick, WA (US)

(73) Assignee: Utah State University Research Foundation, North Logan, UT (US)

( * ) Notice: Subject to any disclaimer, the term of this patent is extended or adjusted under 35 U.S.C. 154(b) by 86 days.

(21) Appl. No.: 14/333,150

(22) Filed: Jul. 16, 2014

(65) Prior Publication Data

US 2015/0022809 A1  Jan. 22, 2015

Related U.S. Application Data

(60) Provisional application No. 61/846,986, filed on Jul. 16, 2013.

(51) Int. Cl.
*G01J 3/45* (2006.01)
*G01J 3/28* (2006.01)
*G01J 3/26* (2006.01)

(52) U.S. Cl.
CPC .............. *G01J 3/2823* (2013.01); *G01J 3/26* (2013.01)

(58) Field of Classification Search
CPC .... G01J 3/2823; G01J 3/26; G01J 2003/2879; G01W 1/10; G01W 2001/003
USPC ........................................................ 356/456
See application file for complete search history.

(56) References Cited

U.S. PATENT DOCUMENTS

| | | | |
|---|---|---|---|
| 5,325,175 A | 6/1994 | Mocker et al. | |
| 5,696,579 A | 12/1997 | Johnson | |
| 6,351,307 B1 | 2/2002 | Erskine | |
| 2003/0184748 A1* | 10/2003 | McCarthy | G01J 3/2823 356/328 |
| 2007/0276598 A1* | 11/2007 | Tillotson | G01S 19/14 342/357.52 |
| 2010/0102203 A1 | 4/2010 | Grund | |
| 2011/0164783 A1 | 7/2011 | Hays et al. | |

FOREIGN PATENT DOCUMENTS

WO  9815798  4/1998

OTHER PUBLICATIONS

Ucar, Exosphere—overview, 2011, Online: http://scied.ucar.edu/shortcontent/exosphere-overview.

(Continued)

*Primary Examiner* — Tarifur Chowdhury
*Assistant Examiner* — Jonathon Cook

(57) ABSTRACT

An apparatus for spectroscopic Doppler imaging comprises collection and focusing optics, a field splitter configured to form a composite image from multiple fields of view, and a Fabry-Perot etalon configured to spatially modulate the incoming light in order to analyze the spectral content of the light from spatially resolved regions of a scene. Methods for Doppler imaging of a scene comprise split-field imagery and scene scanning techniques to create a spatially resolved spectral profile spectra of a scene, useful for measuring and profiling wind vectors and temperatures within the scene.

9 Claims, 7 Drawing Sheets

(56) References Cited

OTHER PUBLICATIONS

A. Christensen et al., Observations of Molecular Oxygen Atmospheric Band Emission in the Thermosphere Us-ing the Near Infrared Spectrometer on the iss/raids Experiment, Journal of Geophysical Research, Apr. 24, 2012, vol. 117, iss. A4.
V. Krassovsky et al., Atlas of the Airglow Spectrum 3000-12400a, Planetary and Space Science, 1962, p. 883-915, vol. 9, iss. 12.
G. Shepherd et al., WINDII, the Wind Imaging Interferometer on the Upper Atmosphere Research Satellite, Journal of Geophysical Research, Jun. 20, 1993, p. 10725-10750, vol. 98, iss. D6.
P. Hays et al., The High-resolution Doppler Imager on the Upper Atmosphere Research Satellite, Journal of Geophysical Research, Jun. 20, 1993, p. 10713-10723, vol. 98, iss. D6.
University of Michigan, The High Resolution Doppler Imager, http://hrdi.engin.umich.edu/.
B. Webster, 500-Mile Footprint for Debris, 2011, online: http://www.washingtonpost.com/national/health-science/500-mile-footprint-for-debris/2011/09/18/gIQAuUjedK_graphic.html.
Canadian Space Agency, OSIRIS at the Forefront of the Study of Ozone Depletion, 2001, online: http://www.asc-csa.gc.ca/eng/satellites/odin.asp.
GATS Inc., Facts, 2007, online: http://www.asc-csa.gc.ca/eng/satellites/odin.asp.
University of Michigan, TIDI Team, Data Quality and Validation, online: http://tidi.engin.umich.edu/html/go?scripts/quality_validation.pl&menu_home.html.
T. Killeen et al., TIMED Doppler Interferometer: Overview and Recent Results, Journal of Geophysical Research, 2006, vol. 111, iss. A10.
NASA, NASA Image: S129E009592, 2012, online: http://www.nasa.gov/mission_pages/station/research/experiments/689.html.
Pumpkin Inc., CubeSat Kit, 2012, online: http://www.cubesatkit.com/.
S.C. Barden et al., Volume-Phase Holographic Gratings and Their Potential for Astronomical Applications, 1998, p. 866-876, vol. 3355.
Semiconductor Components Industries LLC, HAS2 Image Sensor, 2012, online:http://www.onsemi.com/pub_link/Collateral/NOIH2SM1000A-D.PDF.
C. Englert et al., Initial Gound-based Thermospheric Wind Measurements Using Doppler Asymmetric Spatial Heterodyne Spectroscopy (DASH), Optics Express, 2010, p. 27416-27430, vol. 18, iss. 26.
P. Sheese et al., Temperatures in the Upper Mesosphere and Lower Thermosphere from OSIRIS Observations of O2A-band Emission Spectra, Canadian Journal of Physics, 2010, p. 919-925, vol. 88.

* cited by examiner

SPLIT FIELD SPECTRAL IMAGER

PRIORITY CLAIM

The present Application for Patent claims priority to U.S. Provisional Patent Application No. 61/846,986 by Marchant et al., entitled "Split Field Spectral Imager," filed Jul. 16, 2013, assigned to the assignee hereof, and expressly incorporated by reference herein.

TECHNICAL FIELD

The present disclosure relates to optical spectroscopy, and more specifically to devices and methods for spectral imaging. Spectral imaging may refer to collecting and analyzing radiation from a scene in order to create a spatially resolved characterization of electromagnetic spectral content of the scene. The present disclosure relates to devices and methods for detecting spatial Doppler shifting of electromagnetic radiation that may be the result of the behavior or conditions of a target surface or an intermediate medium, such as an atmosphere or a liquid or gaseous volume.

SUMMARY

The following specification relates to methods, apparatuses and improvements in spectroscopy and Doppler imaging. Weather models and measurements play a critical role in shipping itineraries, private and commercial transportation, regional emergency preparedness, aerospace and many other endeavors. Accuracy and precision of weather forecasts depend on the computational details of the weather models and the accuracy and detail of observational initialization data. The vast majority of meteorological data recorded is taken from the lowest layers of the atmosphere, where in situ sensors are practical and relatively inexpensive. Because the upper layers of the atmosphere are difficult to directly measure with traditional barometric pressure sensors, thermometers and wind sensors, the upper layers have not been observed to the same degree as the lower layers.

In one configuration, a Doppler imager is described. The Doppler imager may include fore-optics configured to collect radiation from two or more fields of view and intermediate optics configured to superimpose the radiation into a composite intermediate image. The Doppler imager may also include a Fabry-Perot etalon configured to spatially modulate the composite image into a modulated image. The Doppler imager may further include aft-optics configured to focus the modulated image onto non-overlapping regions of a focal plane array.

In another configuration, a method for Doppler imaging is described. The method may include collecting, by a Doppler imager, radiation from a medium along a first field of view and along a second field of view. The method may also include directing the radiation into an etalon of the Doppler imager. The method may further include determining one or more conditions of the medium from an image of the radiation that passed through the etalon.

DETAILED DESCRIPTION

Figure 1:
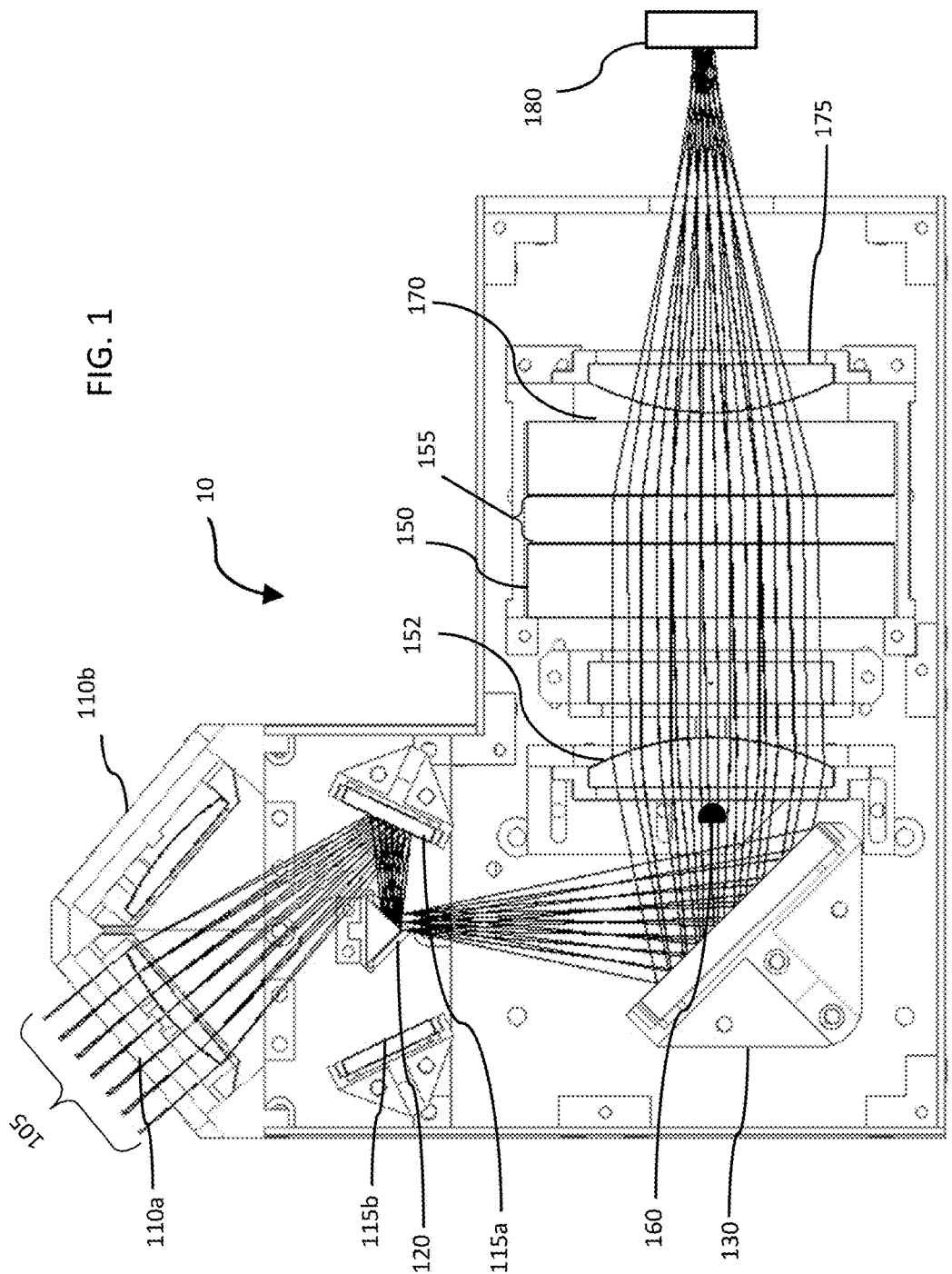
FIG. 1 illustrates one embodiment of a split-field Doppler imager.

The present disclosure covers apparatuses and associated methods for split-field Doppler imaging. In the following description, numerous specific details are provided for a thorough understanding of specific embodiments. However, those skilled in the art will recognize that embodiments can be practiced without one or more of the specific details, or with other methods, components, materials, and the like. In some cases, well-known structures, materials, or operations are not shown or described in detail in order to avoid obscuring aspects of the embodiments. Furthermore, the described features, structures, or characteristics may be combined in any suitable manner in a variety of alternative embodiments. Thus, the following more detailed description of the embodiments of the present disclosure, as illustrated in some aspects in the drawings, is not intended to limit the scope of the disclosure but is merely representative of the various embodiments of the disclosure.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional," "optionally," or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

The following specification relates to methods, apparatuses and improvements in spectroscopy and Doppler imaging. Weather models and measurements play a critical role in shipping itineraries, private and commercial transportation, regional emergency preparedness, aerospace and many other endeavors. Accuracy and precision of weather forecasts depend on the computational details of the weather models and the accuracy and detail of observational initialization data. The vast majority of meteorological data recorded is taken from the lowest layers of the atmosphere, where in situ sensors are practical and relatively inexpensive. Because the upper layers of the atmosphere are difficult to directly measure with traditional barometric pressure sensors, thermometers and wind sensors, the upper layers have not been observed to the same degree as the lower layers.

Some more primitive weather models may virtually exclude contributions and effects of the upper layers of the atmosphere and thus are unable to account for its changes and influence. Increasing data accumulated from the upper atmosphere may aid in creating more accurate weather models and may improve the accuracy and precision of weather forecasts. In the past several decades, researchers have employed Doppler-sensing instruments in order to remotely observe temperature, barometric pressure, wind speed, and wind direction of higher layers of the atmosphere. Doppler Sensing may refer to detecting spectral content and behavior from one or more directions in order to infer temperature and wind motion of molecules or particles in a region of interest.

Doppler Sensing can be used to acquire a spatially resolved image of Doppler shifts in an electromagnetic emission or absorption spectrum within one or more fields of view. Spatial resolution may be used in matching meteorological phenomena to geographic position, further enhancing the detail and precision of meteorological data acquired. When operating a Doppler imaging device to observe conditions of the upper atmosphere, it may be advantageous to deploy the device on an aircraft or satellite in order to avoid interference or back scattering from clouds or other particles prevalent in the lower layers of the atmosphere. Bulky and complex Doppler imaging apparatuses are not ideal for operation on a satellite because of size, mass and power restrictions and the fact that satellites are not readily accessible for repairs. For example, an active Doppler Sensor includes an illumination source that greatly increases the sensor size and power. For the forgoing reasons, the researchers of the present disclosure have identified a need for a static (e.g., no moving parts), passive (e.g., no illuminator), compact, and/or robust Doppler imaging apparatus capable of acquiring spatially resolved images of high-resolution Doppler data from a scene.

Doppler sensing methods analyze the wavelength shift and spectrum of a known light source traveling through a medium of interest in order to infer conditions or behavior of the medium. The medium may be an atmosphere comprising gasses and particulate matter, and the conditions of that medium may be temperature, barometric pressure, wind speed, or wind direction. Well-defined electromagnetic radiation from a known source may pass through the atmosphere and interact with gas molecules and other particles via scattering, luminescence, reflection, emission, or absorption. The known source could be radiation from an atomic or molecular event, such as an electron transition or chemical transition in atmospheric gasses. Atoms, molecules or particles in the medium may absorb photons of an original wavelength and re-emit photons having a shifted wavelength. Alternatively, the known source may be atomic or molecular events within the medium emitting photons with wavelength shifted from a nominal value. The shift in wavelength may depend on the velocity of the atom, molecule or particle with respect to an observer. Shifts in the mean wavelength may be referred to as "red-shifts" or "blue-shifts," depending on the direction of movement of the molecule or particle with respect to the observer. Atoms, molecules or particles re-emitting photons while traveling toward an observer will emit a blue-shifted photon (shorter wavelength), while atoms, molecules or particles traveling away from an observer will emit a red-shifted photon (longer wavelength). A statistical distribution of wavelengths absorbed or emitted may also depend on intrinsic properties of the medium, including temperature and pressure.

If many photons are measured or analyzed, one may obtain a detailed wavelength distribution or spectrum. Details of the spectrum, such as line width, may be due to the behavior of molecules or particles in an intermediary medium. By comparison with the known source spectrum with reference to a physical model of the light source, the shift or shape of the spectrum can provide information about the general behavior or state of the medium, which includes but is not limited to temperature, wind speeds, wind direction, and barometric pressure.

One can retrieve spatially resolved spectral data using a Fabry-Perot etalon with a known etalon transmission function in an optical system with the following characteristics. Each resolved region of the scene illuminates corresponding non-overlapping areas on the image plane through the etalon; each point on the image plane area is illuminated predominantly by rays that pass through the etalon at approximately the same angle of incidence; and the image plane area includes at least one fringe of the etalon interferogram. Spectral information for the resolved region of the scene may be obtained by analyzing one or more of the location, width, and profile of the observed fringes with reference to the etalon's known transmission function.

Alternatively, one can retrieve spatially resolved spectral data using a Fabry-Perot etalon with a known etalon transmission function in an optical system with the following characteristics. The scene is imaged onto an image plane through the etalon; the optical rays from each point in the scene pass through the etalon at approximately the same angle of incidence; and multiple images are collected while scanning the optical system such that a target point in the scene passes through at least one fringe of the etalon interferogram. The spectral information for the target point may be obtained by constructing a fringe pattern corresponding to the target point as observed in the multiple images and analyzing the location, width, and profile of the observed fringes with reference to the etalon's known transmission function.

Fabry-Perot etalons have the advantage of a compact design and may function with no moving parts, providing added robustness to a system. The operation of a Fabry-Perot etalon and its interferogram fringe pattern will be discussed herein.

Observing light from a scene from two or more non-parallel directions may be beneficial in uniquely ascertaining a two-dimensional wind direction using a Doppler Sensor. The spectra of a scene imaged from two different directions can be compared against one another in order to infer wind directions by position in the scene. By measuring the spectrum of a single scene from two or more non-parallel directions, more accurate and precise inferences can be made about the temperature, wind speed, etc. of the atmosphere or medium.

Imaging a scene from two directions may be performed using duplicate light sensors working in harmony to record a single measurement. Duplicate components can decrease performance efficiency and increase manufacturing expense. Collecting images from two or more scenes simultaneously and projecting the images onto distinct sectors of a single focal plane array may maintain operational efficiency and a low-cost design. This method may be referred to as split-field imaging. In embodiments, a Doppler split-field imager is configured to collect light from two or more non-parallel directions and project the light from the multiple directions through a Fabry-Perot etalon and subsequently onto separate sectors of a single focal plane array. Split-field imaging may refer to a method of focusing light from multiple non-parallel fields of view onto a single focal plane array without image overlap. If the sensor is moving, multiple views of a single scene may be constructed by combining split-field sectors from two or more successive images.

FIG. 1 is a schematic drawing illustrating one embodiment of a split-field Doppler imaging apparatus 10. FIG. 1 shows radiation 105 entering through a single aperture 110a, which may be referred to as a forward aperture 110a. The drawing illustrates two apertures, the forward aperture 110a and an aft aperture 110b. Radiation 105 may also enter through the aft aperture 110b. However, in order to preserve the visual simplicity of the drawing, FIG. 1 shows ray tracing only along a path of the radiation 105 entering the forward aperture 110a. In this example, the two apertures, 110a and 110b, are oriented to collect radiation 105 from non-overlapping fields of view. Radiation 105 entering through the forward aperture 110a and aft aperture 110b reflects off mirrors 115a and 115b, respectively. Light reflecting off either of the two mirrors 115a and 115b may then reflect off a surface of a field splitter 120 configured to superimpose the forward and aft radiation 105 onto a single composite intermediate image plane near the apex of the field splitter 120. Subsequently, the superimposed radiation 105 reflects off a mirror 130 configured to direct radiation 105 through a Fabry-Perot etalon 150.

Some embodiments of a split-field Doppler imaging apparatus 10 may also include collimating optics 152 which comprise one or more lenses or mirrors configured to collimate light rays from each point in the composite image prior to passage through the Fabry-Perot etalon 150. Additionally, one or more re-imaging lenses or mirrors 175 positioned optically after the Fabry-Perot etalon 150 may be configured to refocus the light rays from each point in the composite image onto a point on the focal plane array.

The radiation 105 that passes through the etalon 150 may be spatially modulated with respect to the transmission function of the etalon 150, which may be dependent on the thickness of an etalon gap 155, an index of refraction of etalon gap 155, an internal angle of incidence of the radiation 105 entering etalon 150, and wavelength of the radiation 105. The radiation 105 may then pass through a band-pass filter 170 configured to confine the wavelengths of the radiation 105 that are focused onto a focal plane array (FPA) or camera 180 by a re-imaging lens 175.

Furthermore, in some examples of the imaging apparatus 10, a calibration source 160 may be positioned to illuminate the focal plane through the etalon 150. The calibration source 160 may emit a known spectrum of radiation that is conditioned by the etalon 150 and focused onto the FPA 180 to aid in calibrating the imaging apparatus 10. During calibration of imaging apparatus 10, imaging apparatus 10 may be configured such that the only radiation impinging on the FPA 180 is radiation supplied by the calibration source 160. In some embodiments, calibrating the imaging apparatus 10 may be a step that is routinely and frequently executed in order to provide more accurate and precise spectral measurements of a scene.

Figure 2:
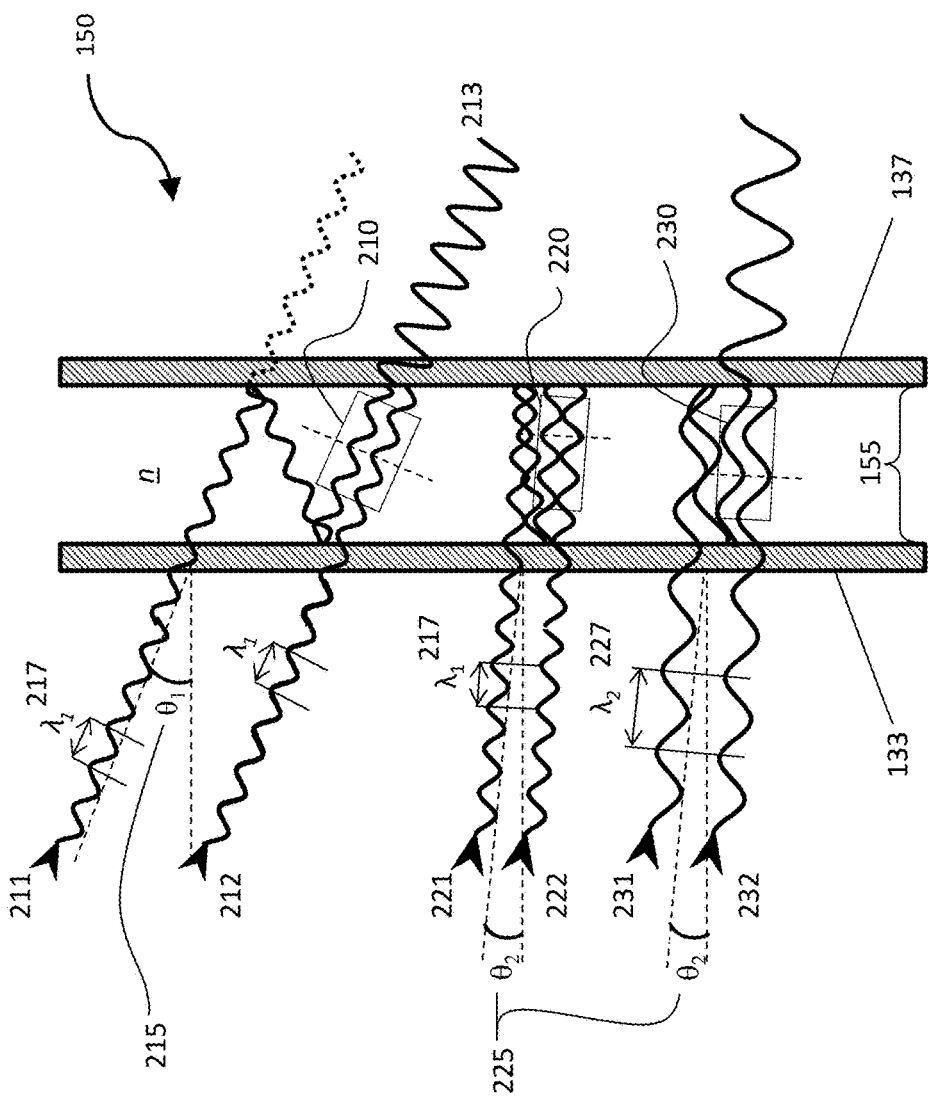
FIG. 2 illustrates one embodiment of a Fabry-Perot etalon and its function.

Referring to FIG. 2, a Fabry-Perot etalon 150 may be briefly described as an optical filter with two parallel, partially reflecting surfaces and no moving parts. A transmission function of an etalon describes a fraction of energy in a light ray that is transmitted through the etalon. The transmission function, $T(\lambda,d)$, of the etalon may be a function of wavelength of the ray $\lambda$, and an effective etalon path length d through the etalon. The effective etalon path length $d(\lambda,\theta)$ may be a function of an etalon gap spacing $d_0$ 155 between the two partially reflecting surfaces, the index of refraction n of the etalon gap material, and the angle of incidence of the light ray $\theta$ entering the etalon 150. For example, in FIG. 2 an angle of incidence for ray 211 is denoted by $\theta_1$ 215 while an angle of incidence for parallel rays 221 and 231 is denoted by $\theta_2$ 225.

The transmission function demonstrates that the transmission of a ray of energy through a Fabry-Perot etalon depends on the wavelength of the ray and the effective etalon path length. A ray of light having one combination of wavelength and angle of incidence may exit the etalon with little attenuation, while a ray having a different combination of wavelength and angle of incidence may be reflected and/or absorbed with strong transmissive attenuation. The result of the transmission function of the etalon on monochromatic incoming energy may be a pattern of concentric interference fringes or rings referred to as an interferogram that, when analyzed, can provide spectral information about the scene.

FIG. 2 is a schematic drawing illustrating the coherent transmission and attenuation of electromagnetic energy through a Fabry-Perot etalon 150. A first incoming ray 211 with an angle of incidence $\theta_1$ 215, an initial phase $\phi_0$ (not illustrated) and a wavelength $\lambda_1$ 217, passes through a first partially reflective surface 133 and enters the etalon gap 155. The first ray 211 then reflects off a second partially reflective surface 137, which is parallel to the first partially reflective surface 133. The first ray 211 reflects off the first partially reflective surface 133. The first ray 211 may maintain the same angle of incidence with respect to the partially reflective surfaces 133 and 137. The coherent radiation, giving rise to ray 211, may be understood as a succession of planar wavefronts. This radiation gives rise to other rays parallel to ray 211, including ray 212 that enters the etalon with phase $\phi_1$ at the point where ray 211 is reflected from surface 133. The combination of $\lambda_1$ and effective etalon thickness $d(\lambda_1, \theta_1)$ are such that the phase of ray 211 as reflected from surface 133 also equals $\phi_1$. Because ray 212 has the same phase $\phi_1$ as the reflected first ray 211 inside the etalon 150, the first ray 211 and second ray 212 are considered to be in phase and undergo constructive interference 210, whereby transmission of the electromagnetic energy through the etalon 150 is enhanced and its reflection and attenuation are minimized.

A third ray 221 has the same wavelength $\lambda_1$ as the first 211 and second 212 rays, but a different angle of incidence $\theta_2$ 225. Similar to the first ray 211, the third ray 221 passes through the first reflective surface 133 with phase $\phi_3$ and reflects off the second reflective surface 137. The third ray reflects off the first reflective surface 133, maintaining the same wavelength $\lambda_1$ 217 and angle of incidence $\theta_2$ 225. A fourth ray 222 arising from the same coherent radiation as ray 221 has the same wavelength 217 and angle of incidence $\theta_2$ 225 as the third ray 221. The fourth ray 222 passes through the first partially reflective surface 133 with phase $\phi_4$ at the location where the third ray 221 reflects off the first partially reflective surface 133. The combination of $\lambda_1$ and effective etalon thickness $d(\lambda_1,\theta_2)$ are such that the phase of the third ray 221 as reflected from surface 133 differs from $\phi_4$ by 180 degrees. Because the fourth ray 222 is out of phase with the third ray 221, the third ray 221 and fourth ray 222 may undergo deconstructive interference 220 whereby reflection and attenuation of the electromagnetic energy is maximized and its transmission through the etalon 150 is minimized.

A fifth ray 231 with wavelength $\lambda_2$ 227, angle of incidence $\theta_2$ 225 and phase $\phi_5$ passes through the first partially reflective surface 133. Like the first ray 211 and third ray 221, the fifth ray 231 reflects off the second partially reflective surface 137 and off the first partially reflective surface 133. A sixth ray 232 arising from the same coherent radiation as the fifth ray 231 passes through the first partially reflective surface 133 with phase $\phi_6$ at the location where the fifth ray 231 reflects off the first partially reflective surface 133. The combination of $\lambda_2$ and effective etalon thickness $d(\lambda_2,\theta_2)$ are such that the phase of the fifth ray 231 as reflected from the first partially reflective surface 133 matches $\phi_6$. The two interfering rays 231 and 232 are in phase and undergo constructive interference 230 whereby transmission of the electromagnetic energy through the etalon 150 is maximized.

Although FIG. 2 illustrates multiple mutually coherent rays interfering, it should also be understood that the Fabry-Perot etalon 150 superimposes many rays, including contributions from higher-order reflections inside the etalon 150. A purpose of FIG. 2 may be to illustrate how the transmission function of the etalon, $T(\lambda,d)$, may be enhanced or reduced by interference effects within the etalon gap. Knowledge of $T(\lambda,d)$ enables an analyst to derive information on the incoming radiation spectrum from images collected at the focal plane, such information including line-of-sight Doppler shifts due to behavior of a medium, such as temperature and wind.

Figure 3:
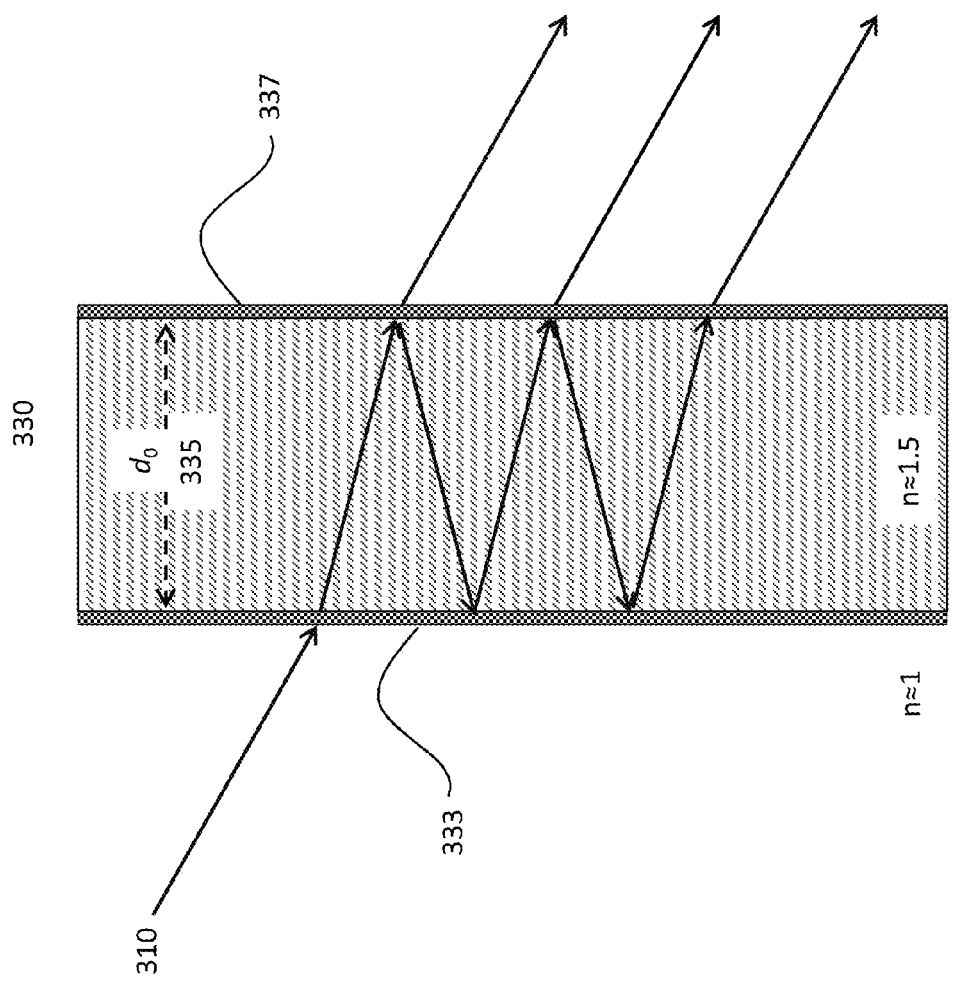
FIG. 3 illustrates another embodiment of a Fabry-Perot etalon.

FIG. 3 illustrates an alternate embodiment of a Fabry-Perot etalon 330. While the design or manufacture of the embodiments may differ, the function may be essentially the same. Embodiments of a Fabry-Perot etalon described in this specification thus far may benefit from being able to function with no moving parts. In particular, the Fabry-Perot etalon 330 can function without any changes in the etalon gap thickness. In one embodiment, the Fabry-Perot etalon 330 comprises a single piece of glass or similar material with two parallel and opposing external surfaces 333 and 337. The two parallel and opposing external surfaces 333 and 337 may be partially reflective. Similar to other embodiments, these partially reflective surfaces 333 and 337 may have reflection coefficients greater than 0 and less than 1. In some embodiments, reflective coefficients of the two external surfaces 333 and 337 may be the same or different. The opposing external surfaces 333 and 337 enclosing an etalon gap 335, $d_0$, may be substantially parallel and that parallelism may be maintained by the structural integrity of the solid material comprising the etalon gap 335. Embodiments similar to the etalon 330 described in FIG. 3 may have manufacturing or durability advantages.

As exemplified in FIG. 1, one embodiment of a Fabry-Perot etalon 150 may comprise two pieces of glass or similar material, being separated by an etalon gap 155. The etalon gap 155 may comprise a vacuum, gas, or some other material. The etalon gap 155 may have a different index of refraction than the two pieces of glass. The inside surfaces of the glass pieces may have partially reflective surfaces where each reflective surface may have the same or different reflectivity. The reflectivity R of the two surfaces may be greater than 0 and less than 1. In embodiments, the opposing reflective internal surfaces are parallel to one another. Furthermore, increasing or decreasing the reflectivity of the two surfaces may directly affect a coefficient of finesse F of the etalon 150. The coefficient of finesse F may affect the appearance or structure of the interferogram. In embodiments where the etalon 150 has a relatively high coefficient of finesse F, the resulting interference fringes or rings may be narrower or more defined with respect to the spacing between successive fringes. Narrow or more defined fringes may be easier to discern and analyze, and may provide more precise measurements while broader, brighter fringes from an etalon with a relatively small coefficient of finesse F may be beneficial in situations with less incoming energy. The coefficient of finesse F may be entirely dependent on the reflectivity and may be defined by the relationship:

$$F = \frac{4R}{(1-R)^2}$$

where R is the reflectivity.

Returning to FIG. 3, incoming radiant energy 310 may have varying angles of incidence. However, it may be advantageous that the angles of incidence are confined to be relatively small or near normal (between 0 to 10 degrees). Confining the field of view of the scanning etalon spectroscopy device to near-normal angles of incidence may limit the number of interference rings produced by the etalon, which may allow for simpler, faster, or more precise data analysis.

Figure 4:
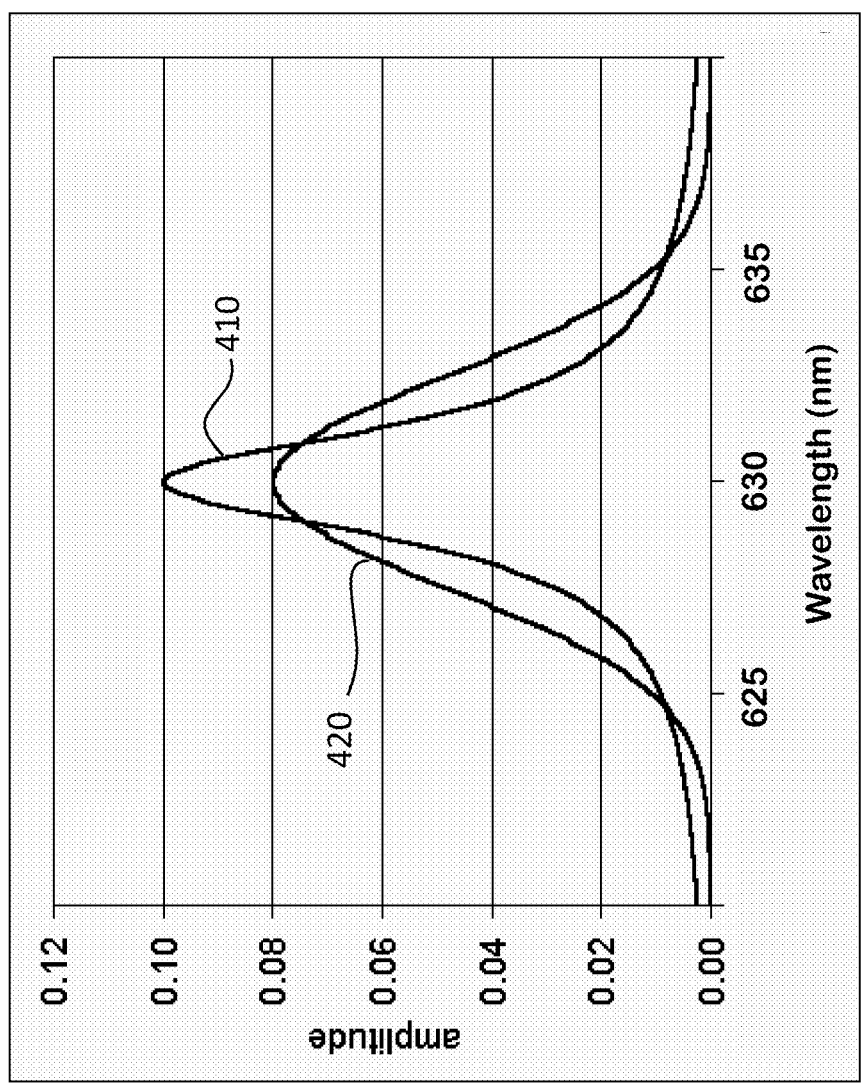
FIG. 4 illustrates spectral changes of a known radiation source due to a Doppler shift.

FIG. 4 is a graph illustrating spectral changes of a known radiation source due to a Doppler shift. In particular, FIG. 4 demonstrates a Doppler broadening of a reference spectrum due to thermal behavior of an emitting or scattering medium. A narrower Lorentzian curve 410 shown represents a reference emission spectrum in the absence of Doppler broadening. In some cases, a known source that provides the reference emission spectrum may be the result of some atomic emission event, such as electron transitions of atomic oxygen in the upper atmosphere. Such atomic emission events may occur more frequently in higher regions of the atmosphere, a convenient phenomenon that provides an altitude-specific source of radiation.

Referring to FIG. 4, the taller, narrower peak 410 shows the pure original source of radiation, e.g., from isolated atoms at rest, while the shorter, broader, Gaussian peak 420 shows a modified spectrum emitted from a thermalized ensemble of emitters or radiation scattered by a medium including thermalized atoms or molecules. Atoms or molecules in the medium may absorb photons of the pure and well-known radiation source and reemit the photons while in motion. The reemitted photons may have slightly shifted wavelengths depending on a velocity of the molecule or particle during reemission with respect to an observer. When many of the reemitted photons are collected and analyzed, a spectrum 420 can be measured. The measured spectrum 420 of the Doppler-shifted light has a broader range and a shallower peak due to the Doppler shifting within the medium.

The Lorentzian 410 and Gaussian 420 spectra in FIG. 4 may have peaks located at the same position along the horizontal axis. The horizontal axis represents wavelength and the vertical axis represents amplitude. In this case, it may be inferred that the Doppler shifting that occurred was due entirely to the temperature of the medium, and not due to bulk motion or wind. In cases where wind is responsible for the Doppler shifting of radiation, the peak or mean value of the Gaussian spectrum 420 may be expected to shift along the wavelength axis depending on the direction and speed of the wind with respect to the Doppler imaging device. If a wind vector in a field of view has a substantial component heading towards the Doppler imager (e.g., observer), then there will be an overall trend of blue shifting, and the peak would shift to the left along the wavelength axis. If a substantial component of the wind vector is heading away from the Doppler imager, then there will be an overall trend of red shifting of the imaged medium, and the peak would move to the right along the wavelength axis.

Figure 5:
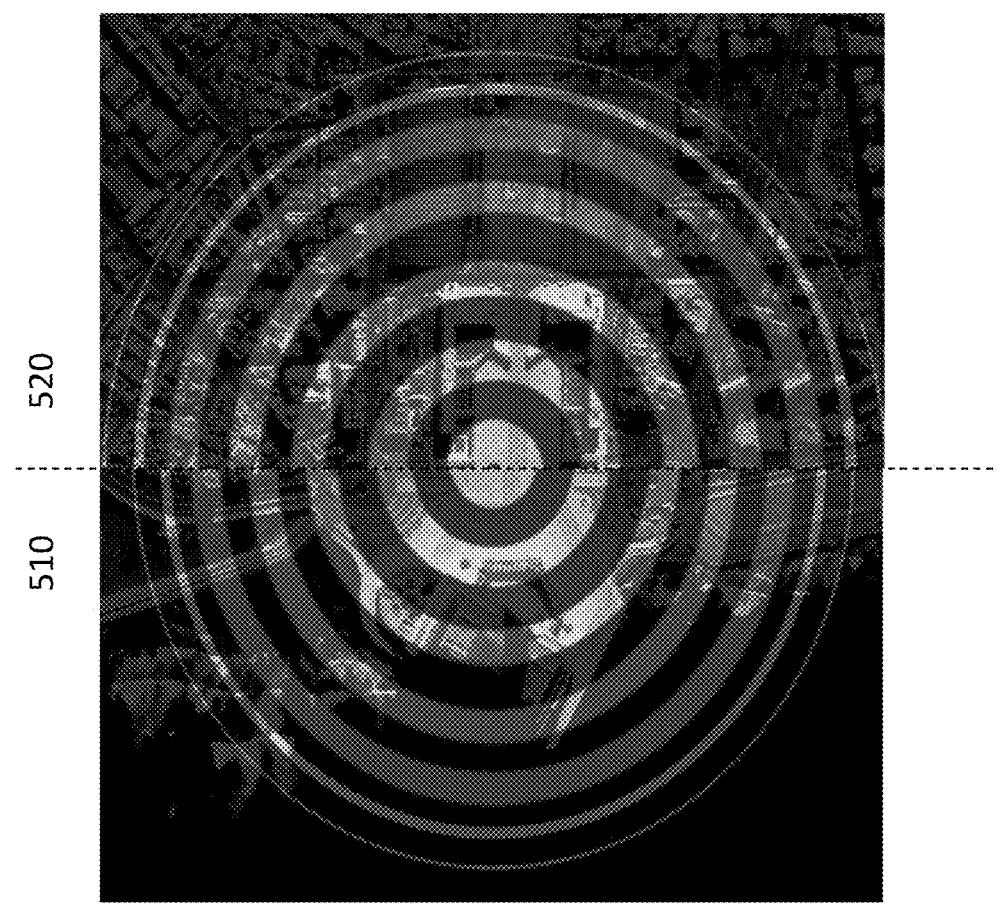
FIG. 5 is an example of an image collected by a split-field Doppler imaging device.

FIG. 5 is an example of a single prophetic image captured by a split-field Doppler imaging device using a Fabry-Perot etalon, such as split-field Doppler imaging device 10 of FIG. 1 using the Fabry-Perot etalon 150 or 330 of FIGS. 2 and 3, respectively. If the Doppler imaging device 10 were to be used on a satellite, the source of energy may be a scene from the atmosphere or surface of the Earth. FIG. 5 shows two scenes that may be simultaneously imaged by the Doppler imaging device 10. The two scenes may be imaged on a single Focal Plane Array, with the Doppler imaging device 10 configured to image a scene from two different points of reference as the device moves with respect to the scene. The image shows transmission fringes from an interferogram from the etalon spatially modulating an image of the scene. The image is split down the center, with a left side 510 imaging a first scene and a right side 520 imaging a second scene. The interferogram is also split, and has subtle but measurable differences in fringe phase and spacing on the two sides 510 and 520. This may be due to slightly different spectral content from the two scenes, which when modulated by the interferogram, produces differences in the interferogram's pattern or structure. A scene may scan across the field of view of the Doppler imaging device 10, or vice versa, while the Doppler imaging device 10 takes several consecutive images. The image of the moving scene may be said to modulate the interferogram. The interferogram of each image can be analyzed and deconvolved with respect to the etalon transmission function in order to determine at least one characteristic about the scene spectrum.

A Doppler imaging device that does not have split-field capabilities may be able to detect only changes in wavelength due to line-of-sight Doppler shifts between an emission or scattering event and an observer. Thus, one cannot accurately characterize the wind vectors if the scene were only measured from one direction. By measuring a single scene, such as a region on the surface of the earth, from at least two non-parallel directions, one could compare the two or more line of sight Doppler shifts of the scene from the plurality of directions in order to correctly characterize the direction of the wind. If a split-field spectral imager, such as split-field Doppler imaging device 10, were to be used on a satellite, the device 10 may image a region of the Earth from two directions by imaging the region at a first time from a forward aperture, and later image the same scene at a second time through the aft aperture. In this application, one must assume that the local wind vector is the same during the Forward and Aft image captures.

Figure 6:
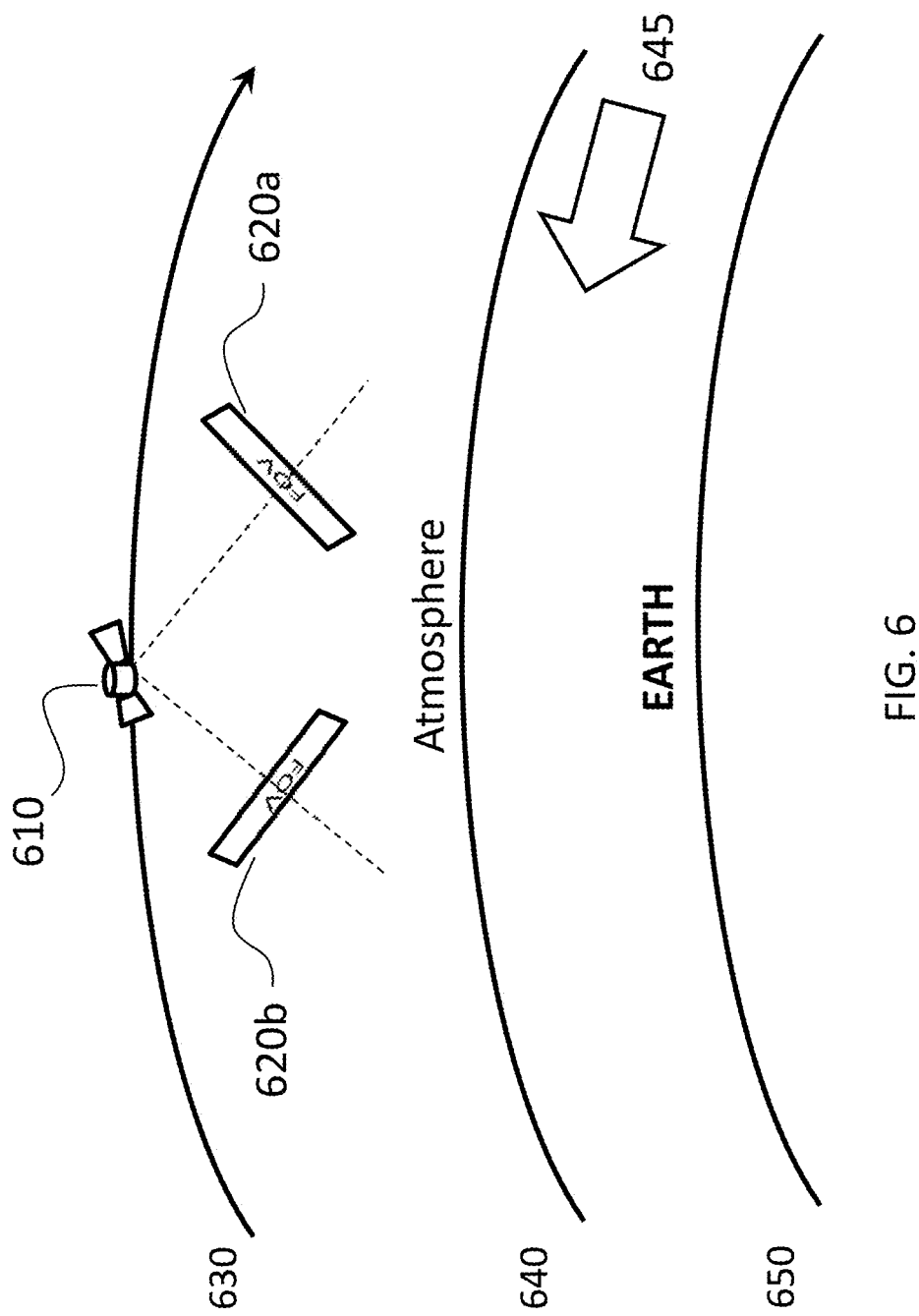
FIG. 6 is a schematic drawing illustrating one application of a satellite-based split-field Doppler imaging device.

FIG. 6 is a schematic drawing illustrating an operational deployment of a split-field Doppler imaging device, such as split-field Doppler imaging device 10 of FIG. 1. FIG. 6 shows a satellite 610 in an orbit 630 around the Earth 650. The satellite 610 is outfitted with a split-field Doppler imaging device 10, which collects incoming radiation from the Earth's atmosphere 640 in two fields of view (FOV) 620a and 620b and projects focused radiation from the two field of views onto a single image plane within the device 10. One field of view may be referred to as the "Forward FOV" 620a while the other may be referred to as the "Aft FOV" 620b. With reference to FIG. 6, one may see that as the satellite 610 moves in an orbit 630 around the earth 650, a scene first captured in the Forward FOV 620a may eventually be re-captured, at least in part, by the Aft FOV 620b. Referring back to FIG. 5, the left side 510b may show a scene from the Aft FOV 620b, while the right side 510a of the image may show a scene captured in the Forward FOV 620a.

Because the scene brightness from the Earth's atmosphere may be low, it may be advantageous to incorporate in the instrument a high-sensitivity FPA. For example, the FPA may be an electron-multiplied charge coupled device (EM-CCD) that is sensitive to signal differences as small as a single photoelectron.

To further explain how a wind vector can be characterized from imaging a scene from two non-parallel directions, consider a horizontal wind field 645 moving uniformly towards the left in FIG. 6 above the Earth's surface along the orbital direction of the satellite 610. If the satellite 610 were stationary in the location as drawn, the photons collected by the split-field Doppler imaging device 10 in the Forward field of view would be blue shifted, while the photons collected in the Aft field of view would be red shifted. By comparing these two shifted spectrums, the line of sight Doppler shift components can be aggregated and compared to yield a horizontal wind vector (direction and magnitude) for each point in the scene. In practice, the satellite 610 is moving along its orbit 630 with a substantial and accurately known orbital velocity. This adds a blue shift to the Doppler observation of the Forward FOV and a red shift to the Doppler observation of the Aft FOV. The known satellite velocity is then subtracted from the derived relative wind vector to obtain the wind field vector 645 relative to the Earth.

In operation, a scanning etalon spectroscopic imaging device like those shown in FIGS. 1 and 6 may be positioned or configured to scan a scene comprising a field of view where the scene may emit radiant energy at one or more frequencies. In one example, we may consider using split-field Doppler imaging device to detect wind vectors and temperature in the upper layers of the Earth's atmosphere.

First, a spectral band for some electromagnetic emission or scattering event in the upper atmosphere is selected. This spectral band may be an emission line for atomic Oxygen, which is most abundant in the upper atmosphere. The emission line of atomic Oxygen may be represented as one or more narrow peaks, having a well-known and defined spectral profile. For example, the diatomic oxygen atmospheric band (A-band) consists of two major peaks near 762 nm.

A calibration image may be collected of a uniform monochromatic scene for which the wavelength is precisely known. The calibration image may then be analyzed and precise geometrical and optical characteristics of the etalon may be derived. The characteristics may comprise the centration of the interferogram pattern on the focal plane. The centration may refer to the geometrical center of the interferogram, which may comprise a series of concentric fringes. The characteristics may further comprise an effective focal length of the reimaging lens 170, and the image distortion due to the reimaging lens 170, which may be due to the detailed structure of the lens. Distortions or aberrations caused by imaging lenses may modify the ideal shape of the image or interferogram, leading to inaccurate calculations if not corrected. Distortion may be accounted for in image analysis, or may be corrected using corrective optics. The derived optical characteristics may further comprise etalon cavity thickness, which may depend on the etalon gap 155, the index of refraction of the material in the etalon gap 155, and the angle of incidence of the energy upon entering the etalon 150. The derived optical characteristics may further comprise an etalon coefficient of finesse F, which may depend on the reflectivity of the two reflective surfaces of the etalon, where a high reflectivity (e.g. 0.75-0.99) may result in a high coefficient of finesse F.

An effective thickness of the etalon 150 or 330 may then be calculated for each pixel on the FPA 180. As stated earlier, the effective etalon thickness may depend on the angle of incidence of radiant energy 110, where the angle of incidence of incoming energy 110 may be matched to a points or pixels on the image plane, or FPA 180. The effective etalon thickness at each pixel, or $d_i$, where the subscript "i" denotes the pixel number, may be calculated by the function:

$$d_i = n \cdot d_0 \cdot \cos \theta_i$$

where $d_0$ represents the etalon gap thickness and $\theta_i$ represents the internal angle of incidence of rays of energy 110 on the reflective etalon surfaces. For the case n=1, the internal angle of incidence is equal to the angle of incidence for radiation entering the etalon. Otherwise the internal angle of incidence depends on the external angle of incidence and the value of n in accordance with Snell's Law. The transmission of radiation 110 passing through the etalon 150 may be a function of wavelength $\lambda$ and effective etalon thickness d. The transmission function may have the form:

$$T(\lambda, d) = \frac{1}{1 + F \cdot \sin^2(\delta)} \text{ where } \delta = \frac{2\pi d}{\lambda}.$$

After collecting one or more calibration images, a series of images may be collected as the scene scans across the field of view of the device, or vice versa. The images may be calibrated to remove pixel offsets such as readout bias or dark current. The images may also be corrected for pixel-to-pixel variations in the readout gain and response non-linearity. Then, combining the calibrated pixel values for a scene point in each image, a function $S_p(d)$ of signal versus effective etalon thickness (d), may be constructed. The subscript "p" in the Signal function $S_p(d)$ may denote the signal at a given scene point referred to as "p." Similarly, the subscript "p" may also denote the pixel for which the signal is calculated. Each point in a scene may correspond to a given pixel on the focal plane array.

Alternatively, if the spatially resolved target point p covers multiple pixels at the image, the function $S_p(d)$ may be constructed from the signal values of a single image without scanning of the scene.

The signal function of a point p in a scene may be an integral of the scene spectral radiance $L_p(\lambda)$ and the transmission of the etalon $T(\lambda,d)$ over the bandpass of the sensor, where the bandpass of the sensor may refer to the range of wavelengths observed or collected by the sensor. The signal function may be defined as:

$$S_p(d) = \int_{bandpass} d\lambda \cdot T(\lambda, d) \cdot L_p(\lambda)$$

In matrix form, the above relationship may also be written as:

$$S_d = T_{d\lambda} \cdot L_\lambda$$

The signal function $S_p$ must account for separate regions of the focal plane array. In some embodiments, the focal plane array may be divided into two regions, each region being illuminated by radiation from either a forward or an aft aperture, as illustrated in FIG. 5. This fact may become significant during spectroscopic analysis. In some embodiments, there may be a time offset between forward and aft images of a scene on the Earth or other observed body. By knowing the velocity of the orbiting satellite with respect to the Earth, the forward and aft images of a scene can be matched and analyzed in order to calculate wind vectors for each point in a scene.

If the number of independent image values in $S_d$ equals the number of wavelength values in the spectrum (size of $L_\lambda$), then the relationship for Signal $S_d$ to Transmission $T_{d\lambda}$ and Spectral Radiance $L_\lambda$ may be solved for $L_\lambda$ to give:

$$L_\lambda = T_{d\lambda}^{-1} \cdot S_d$$

If the size of $S_d$ exceeds the size of $L_\lambda$, then a fit to the spectrum may be approximated for example using the pseudo-inverse method:

$$L_\lambda = (T^T \cdot T)^{-1} \cdot T^T \cdot S_d$$

Note that no unique solution is possible if the size of $S_d$ is less than the number of wavelengths.

Figure 7:
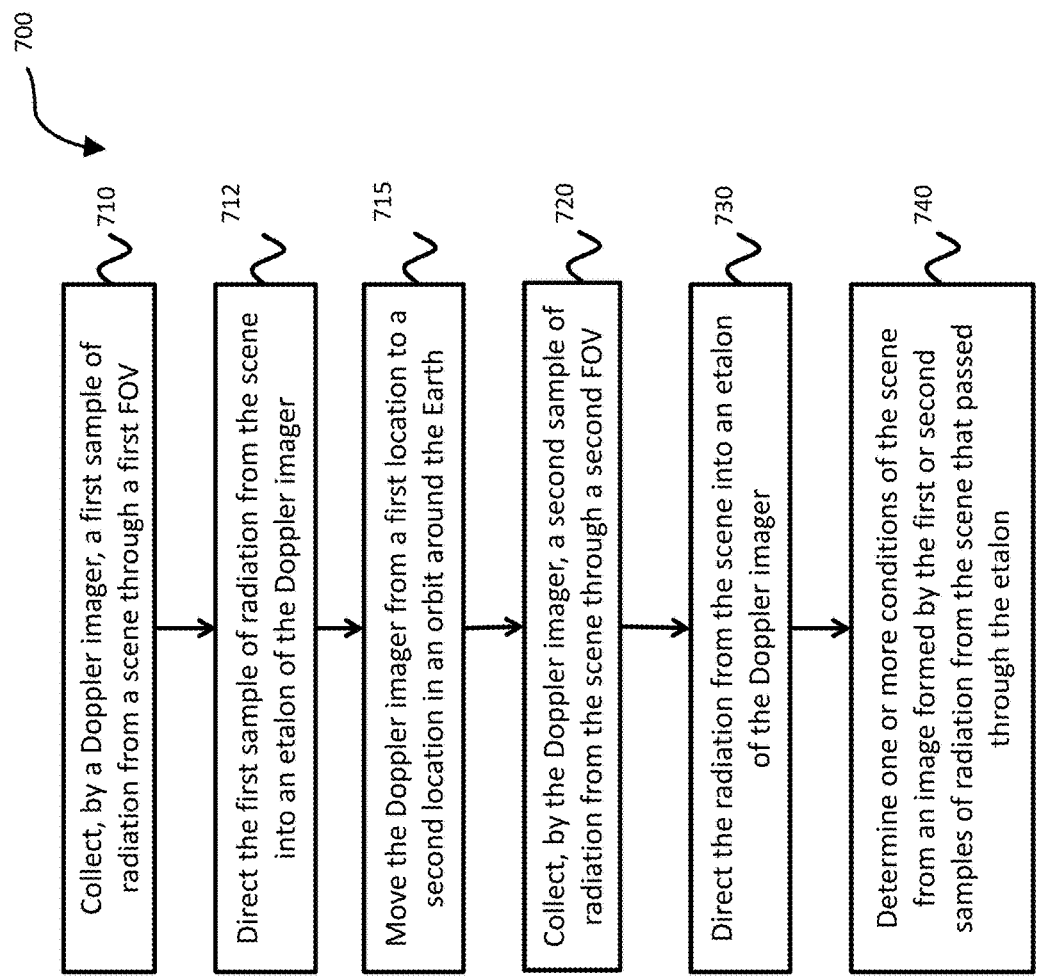
FIG. 7 is a flowchart illustrating an example method of Doppler imaging.

FIG. 7 is a flowchart illustrating an example method 700 of Doppler imaging. For clarity, the method 700 may apply to aspects of the split-field Doppler imaging device 10 described with reference to FIG. 1 or aspects of one or more of the Fabry-Perot etalons 150 and 330 described with reference to FIG. 1, 2, or 3. In some examples, the Doppler imaging is split-field Doppler imaging.

At block 710, the method 700 may include collecting, by a Doppler imager, a first sample of radiation from a scene through a first field of view. The operation(s) at block 710 may be performed using the forward aperture 110a described with reference to the split-field Doppler imaging device 10 of FIG. 1.

At block 712, the method 700 may also include directing the first sample of radiation from the scene into an etalon of the Doppler imager. For example, the radiation 105 may be directed through the Doppler imager to be incident upon the etalon 150 one or more of the Fabry-Perot etalons 150 and 330 described with reference to FIG. 1, 2, or 3. The etalon 150 may include an etalon gap that comprises a space or a solid material, such as the etalon gap 155 of FIGS. 1 and 2 and the etalon gap 335 of FIG. 3. In some examples, the Doppler imager further includes intermediate optics configured to superimpose the radiation 105 into a composite intermediate image and to the etalon.

At block 715, the method 700 may include moving the Doppler imager from a first location to a second location in an orbit around the Earth.

At block 720, the method 700 may include collecting, by the Doppler imager, a second sample of radiation from the scene through a second field of view. The operation(s) at block 720 may be performed using the aft aperture 110b described with reference to the split-field Doppler imaging device 10 of FIG. 1. In some examples, collecting the first sample of radiation through the first field of view further includes collecting the radiation from a first aperture along a first direction, wherein collecting the second sample of radiation through the second field of view further comprises collecting the radiation from a second aperture along a second direction, wherein the first direction is non-parallel with the second direction. For example, the forward aperture 110a collects the radiation 105 from a first FOV, such as FOV 620a of FIG. 6. The aft aperture 110b collects the radiation 105 from a second FOV, such as FOV 620b of FIG. 6.

At block 740, the method 700 may further include determining one or more conditions of the scene from an image formed by the first or second samples of radiation that passed through the etalon. Examples of the one or more conditions of the scene include wind vectors or the temperature within the scene.

The method 700 may include collecting a calibration image of a uniform monochromatic scene of an event for which the wavelength of the event is known. The event may be, for example, an EM Emission or scattering event in the upper atmosphere of the Earth or another object. The method 700 may also include calibrating the Doppler imager based at least in part on the calibration image. The method 700 may include analyzing the calibration image and deriving precise geometrical or optical characteristics of the etalon. Examples of the geometrical and optical characteristics of the etalon include at least one of centration of an interferogram pattern of the image, an effective focal length of a reimaging lens of the Doppler imager, one or more distortions or aberrations caused by one or more imaging lenses of the Doppler imager, a cavity thickness of the etalon, an index of refraction of material in an etalon gap, an angle of incidence of the radiation upon entering the etalon, and an etalon coefficient of finesse F, or combinations thereof. Some further examples of method 700 include correcting for any distortions detected in the etalon.

The method 700 may further include creating a weather model based at least in part on the one or more conditions of the scene. The method 700 may further include determining a temperature, a bulk motion, or a wind of the medium. The method 700 may include determining a wind speed and direction based on Doppler shifting of a measured spectrum with a reference spectrum. For example, wherein the method may include taking a calibration image that comprises a reference spectrum and determining a Doppler shifting of the image based at least in part on a comparison of the image with the reference spectrum. From the determined Doppler shifting, the method 700 may include determining a wind vector of the medium based at least in part on the Doppler shifting. Some examples of method 700 include analyzing a Doppler broadening of a reference spectrum due to thermal behavior of an emitting or scattering medium.

In some examples, such as the satellite 610 example of FIG. 6, the photons collected by the forward aperture 110a (forward field of view) may be blue shifted, while the photons collected in the collected by the aft aperture 110b (aft field of view) may be red shifted. The method 700 may further include comparing these two shifted spectrums, and comparing an aggregated line of sight Doppler shift components to yield a horizontal wind vector (direction and magnitude) for each point in the scene. In some examples, forward and aft measurements may be made at different times and the Doppler shifting may be analyzed with the assumption that the local wind vector is the same at the different times.

The method 700 may further include focusing the radiation that passed through the etalon onto an image plane area to generate the image, wherein each point on the image plane area is illuminated predominantly by the radiation that passed through the etalon at approximately the same angle of incidence. The Doppler imager may include aft-optics configured to focus the modulated image onto non-overlapping regions of a focal plane array.

In additional examples of method 700, one or more additional images are collected to create a series of images. The series of images may be calibrated and corrected based at least in part on a calibration image. The one or more conditions of the medium may be determined from the series of images. For example, the interferogram of each image can be analyzed and deconvolved with respect to the etalon transmission function in order to determine at least one characteristic about the scene spectrum.

In some examples, the method 700 may confine the field of view of the scanning etalon spectroscopy device to near-normal angles of incidence. The method 700 may further limit the number of interference rings produced by the etalon, which may allow for simpler, faster, or more precise data analysis. In other examples, the method 700 may include matching a coefficient of finesse of the etalon to an expected intensity level of the incident radiation.

The above prescription yields the complete scene spectrum, which is readily exploited for scene characterization in many applications using many different analysis techniques. If the component target spectra are known a priori, the procedure detailed above may be modified so that the components of the L vector (a much reduced number) correspond to the several spectral components (not separate wavelengths per se) of the energy collected from the scene. The spectral radiance L can be compared with a known spectral radiance for some electromagnetic event in the upper atmosphere to infer changes in the spectrum due to the Doppler effect, and thereby to detect wind speeds and temperature.

What is claimed is:

1. A method of Doppler imaging, comprising:
collecting, by a Doppler imager, a first sample of radiation from a scene through a first field of view;
directing the first sample of radiation from the scene into an etalon of the Doppler imager;
moving the Doppler imager from a first location to a second location in an orbit around the Earth;
collecting, by the Doppler imager, a second sample of radiation from the scene through a second field of view;
directing the second sample of radiation from the scene into the etalon of the Doppler imager; and
determining one or more conditions of the scene from an image formed by the first or second samples of radiation from the scene that passed through the etalon;
wherein collecting the first sample of radiation from the scene through the first field of view further comprises collecting the radiation from a first aperture along a first direction, wherein collecting the second sample of radiation from the scene through the second field of view further comprises collecting the radiation from a second aperture along a second direction, wherein the first direction is non-parallel with the second direction.

2. The method of claim 1, further comprising:
focusing the first and second samples of radiation that passed through the etalon onto an image plane area to generate the image, wherein each point on the image plane area is illuminated predominantly by the first and second samples of radiation that passed through the etalon at approximately the same angle of incidence.

3. The method of claim 1, further comprising:
collecting a calibration image of a uniform monochromatic scene of an event for which the wavelength of the event is known.

4. The method of claim 3, further comprising:
calibrating the Doppler imager based at least in part on the calibration image.

5. The method of claim 3, wherein the calibration image comprises a reference spectrum, the method further comprising:
determining a Doppler shifting of the image based at least in part on a comparison of the image with the reference spectrum; and
determining a wind vector of the scene based at least in part on the Doppler shifting.

6. The method of claim 3, further comprising:
deriving one or more geometrical or optical characteristics of the etalon from the image, wherein the one or more conditions of the etalon comprise at least one of:
centration of an interferogram pattern of the image,
an effective focal length of a reimaging lens of the Doppler imager,
one or more distortions or aberrations caused by one or more imaging lenses of the Doppler imager,
a cavity thickness of the etalon,
an index of refraction of material in an etalon gap,
an angle of incidence of the radiation upon entering the etalon, and
an etalon coefficient of finesse F,
or combinations thereof.

7. The method of claim 1, wherein the image is a first image, the method further comprising:
collecting one or more additional images to create a series of images;
calibrating and correcting the series of images based at least in part on a calibration image; and
determining one or more conditions of the medium from the series of images.

8. The method of claim 1, further comprising:
creating a weather model based at least in part on the one or more conditions of the scene.

9. The method of claim 1, wherein the image is a modulated image, wherein the etalon comprises a Fabry-Perot etalon configured to spatially modulate a composite image into the modulated image, and wherein the Doppler imager comprises a split-field Doppler imaging device that further comprises intermediate optics configured to superimpose the radiation into a composite intermediate image and aft-optics configured to focus the modulated image onto non-overlapping regions of a focal plane array.

* * * * *